United States Patent
Kang et al.

(10) Patent No.: US 11,725,981 B2
(45) Date of Patent: *Aug. 15, 2023

(54) DIRECTIONAL ACOUSTIC SENSOR, AND METHODS OF ADJUSTING DIRECTIONAL CHARACTERISTICS AND ATTENUATING ACOUSTIC SIGNAL IN SPECIFIC DIRECTION USING THE SAME

(71) Applicant: SAMSUNG ELECTRONICS CO., LTD., Suwon-si (KR)

(72) Inventors: Sungchan Kang, Hwaseong-si (KR); Cheheung Kim, Yongin-si (KR); Choongho Rhee, Anyang-si (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,578

(22) Filed: May 10, 2022

(65) Prior Publication Data
US 2022/0268624 A1  Aug. 25, 2022

Related U.S. Application Data

(63) Continuation of application No. 16/738,123, filed on Jan. 9, 2020, now Pat. No. 11,359,960.

(30) Foreign Application Priority Data

Jun. 20, 2019 (KR) .................. 10-2019-0073751

(51) Int. Cl.
*G01H 3/00* (2006.01)
(52) U.S. Cl.
CPC .................. *G01H 3/005* (2013.01)

(58) Field of Classification Search
CPC .... G01H 3/005; H04R 1/406; H04R 2410/01; H04R 2430/23; H04R 2430/25;
(Continued)

(56) References Cited

U.S. PATENT DOCUMENTS 5,856,722 A  1/1999  Haronian et al.
8,103,027 B2  1/2012  Zhang et al.
(Continued)

FOREIGN PATENT DOCUMENTS

EP         3 451 011 A1    3/2019
KR   10-2016-0147556 A    12/2016
(Continued)

OTHER PUBLICATIONS

"Digital Voice Assistants in Use to Triple to 8 Billion by 2023", audioXpress, Feb. 14, 2019, 8 pages total.
(Continued)

*Primary Examiner* — Daniel L Murphy
(74) *Attorney, Agent, or Firm* — Sughrue Mion, PLLC

(57) ABSTRACT

Disclosed are a directional acoustic sensor, a method of adjusting directional characteristics using the directional acoustic sensor, and a method of attenuating an acoustic signal in a specific direction using the directional acoustic sensor. The directional acoustic sensor includes a plurality of resonance units arranged to have different directionalities and a signal processor configured to adjust directional characteristics by calculating at least one of a sum of and a difference between outputs of the resonance units. In this state, the signal processor attenuates an acoustic signal in a specific direction by using a plurality of directional characteristics obtained by calculating at least one of the sum of and the difference between the outputs of the resonance units at a certain ratio.

12 Claims, 14 Drawing Sheets

(58) Field of Classification Search
CPC ...... H04R 3/005; H04R 17/10; H04R 23/006; H04R 17/02; H04R 1/32; H04R 1/326; H04R 5/04
USPC .......................................................... 367/13
See application file for complete search history.

(56) References Cited

U.S. PATENT DOCUMENTS

| | | | |
|---|---|---|---|
| 8,170,244 | B2 | 5/2012 | Ryan et al. |
| 9,148,729 | B2 | 9/2015 | Josefsson |
| 9,479,884 | B2 | 10/2016 | Kim |
| 9,781,484 | B2 | 10/2017 | Ferren et al. |
| 9,843,858 | B1 | 12/2017 | Karunasiri et al. |
| 10,042,038 | B1 | 8/2018 | Lord |
| 10,141,007 | B1 | 11/2018 | Kim et al. |
| 10,178,472 | B1 | 1/2019 | Rhee et al. |
| 10,447,238 | B2 | 10/2019 | Kang et al. |
| 10,528,069 | B2 | 1/2020 | Hong et al. |
| 11,359,960 | B2 * | 6/2022 | Kang .................. H04R 23/006 |
| 2016/0050506 | A1 | 2/2016 | Kim |
| 2018/0097506 | A1 | 4/2018 | Kang et al. |
| 2018/0130485 | A1 | 5/2018 | Park et al. |
| 2018/0138886 | A1 | 5/2018 | Yoon et al. |
| 2019/0033904 | A1 | 1/2019 | Hong et al. |
| 2019/0072635 | A1 | 3/2019 | Kang et al. |
| 2019/0174244 | A1 | 6/2019 | Kim et al. |
| 2019/0348050 | A1 | 11/2019 | Kim et al. |
| 2020/0204187 | A1 | 6/2020 | Hong et al. |
| 2020/0212885 | A1 | 7/2020 | Kim et al. |

FOREIGN PATENT DOCUMENTS

| | | |
|---|---|---|
| KR | 10-2019-0014933 A | 2/2019 |
| WO | 2009/062214 A1 | 5/2009 |

OTHER PUBLICATIONS

Communication dated Jul. 6, 2020 issued by the European Intellectual Property Office in counterpart European Application No. 20152917.9.

* cited by examiner

DIRECTIONAL ACOUSTIC SENSOR, AND METHODS OF ADJUSTING DIRECTIONAL CHARACTERISTICS AND ATTENUATING ACOUSTIC SIGNAL IN SPECIFIC DIRECTION USING THE SAME

CROSS-REFERENCE TO RELATED APPLICATION

This application is a continuation of U.S. application Ser. No. 16/738,123, filed Jan. 9, 2020, which claims priority from Korean Patent Application No. 10-2019-0073751, filed on Jun. 20, 2019, in the Korean Intellectual Property Office, the disclosure of which are incorporated herein by reference in their entirety.

BACKGROUND

1. Field

Apparatuses and methods consistent with example embodiments relate to a directional acoustic sensor, and more particularly, to a directional acoustic sensor, a method of adjusting directional characteristics using the directional acoustic sensor, and a method of attenuating an acoustic signal in a specific direction using the directional acoustic sensor.

2. Description of the Related Art

Acoustic sensors that are installed at household appliances, video display devices, virtual reality devices, augmented reality devices, artificial intelligence speakers, and the like to detect a direction from which sound comes and recognize a voice have been widely used. Recently, a directional acoustic sensor that detects an acoustic signal by converting a mechanical movement due to a pressure difference to an electrical signal has been developed.

SUMMARY

One or more example embodiments provide a directional acoustic sensor, a method of adjusting directional characteristics using the directional acoustic sensor, and a method of attenuating an acoustic signal in a specific direction using the directional acoustic sensor.

According to an aspect of an embodiment, there is provided a directional acoustic sensor including: a plurality of resonance units arranged to have different directionalities; and a signal processor configured to adjust directional characteristics of output signals that are received from the plurality of resonance units, by calculating at least one of a sum of the output signals of the plurality of resonance units and a difference between the output signals of the plurality of resonance units.

The plurality of resonance units may include: a plurality of substrates, each of the plurality of substrates having a cavity formed therethrough; and at least one resonator provided in each of the plurality of substrates.

The plurality of substrates are arranged to form an angle less than 180 degrees with each other.

The signal processor may be further configured to acquire first directional characteristics of a first direction by calculating the sum of the output signals of the plurality of resonance units, and acquire second directional characteristics of a second direction that is perpendicular to the first direction by calculating the difference between the output signals of the plurality of resonance units.

The signal processor may be further configured to adjust at least one of output levels of the output signals so that the output levels are different from each other, and calculate the sum or the difference based on the adjusted at least one of the output levels.

The signal processor may be configured to attenuate an acoustic noise signal by calculating the at least one of the sum of and the difference between the output signals of the resonance units at a predetermined ratio.

The signal processor may be further configured to attenuate an acoustic noise signal generated in a second direction by processing a first signal that is obtained from the plurality of resonance units and is oriented in a first direction, and processing a second signal that is obtained from the plurality of resonance units and is oriented in a second direction perpendicular to the first direction.

Each of the first and second signals may be obtained by summing the output signals generated in the first direction and the output signals generated in the second direction at a predetermined ratio.

The signal processor may be further configured to process the first and second signals such that the acoustic noise signal generated in the second direction is removed.

According to an aspect of another example embodiment, there is provided a method of adjusting directional characteristics, including: receiving output signals from a plurality of resonance units arranged to have different directionalities; and adjusting directional characteristics of the output signals by calculating at least one of a sum of the output signals of the plurality of resonance units and a difference between the output signals of the plurality of resonance units.

The adjusting the directional characteristics of the output signals may include: acquiring first directional characteristics of a first direction by calculating the sum of the output signals of the plurality of resonance units; and acquiring second directional characteristics of a second direction that is perpendicular to the first direction by calculating the difference between the outputs of the plurality of resonance units.

The adjusting the directional characteristics of the output signals may include: adjusting at least one of output levels of the output signals so that the output levels are different from each other, and calculating the sum or the difference based on the adjusted at least one of the output levels.

The plurality of resonance units may include: a plurality of substrates, each of the plurality of substrates having a cavity formed therethrough; and at least one resonator provided in each of the plurality of substrates.

The plurality of substrates may be arranged to form an angle less than 180 degrees with each other.

The method may further include: attenuating an acoustic noise signal generated in a second direction by calculating the at least one of the sum of and the difference between the output signals of the resonance units at a predetermined ratio.

The attenuating the acoustic noise signal may include: attenuating the acoustic noise signal in a second direction by processing a first signal that is obtained from the plurality of resonance units and is oriented in a first direction, and processing a second signal that is obtained from the plurality of resonance units and is oriented in the second direction that is perpendicular to the first direction.

The processing the first signal and the processing the second signal may include: summing the output signals generated in the first direction and the output signals generated in the second direction at a predetermined ratio.

The first and second signals may be processed such that the acoustic noise signal generated in the second direction is removed.

According to an aspect of another example embodiment, there is provided a directional acoustic sensor including: a plurality of first resonators configured to have a first directionality; a plurality of second resonators configured to have a second directionality different from the first directionality; and a signal processor configured to receive a first output signal from the plurality of first resonators, receive a second output signal from the plurality of second resonators, and attenuate a noise acoustic signal detected by the plurality of first resonators and the plurality of second resonators, based on a sum of the first output signal and the second output signal or a difference between the first output signal and the second output signal.

The signal processor may be configured to apply a weight to at least one of the first output signal and the second output signal and obtain the sum or the difference by using the at least one of the first output signal and the second output signal to which the weight is applied.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
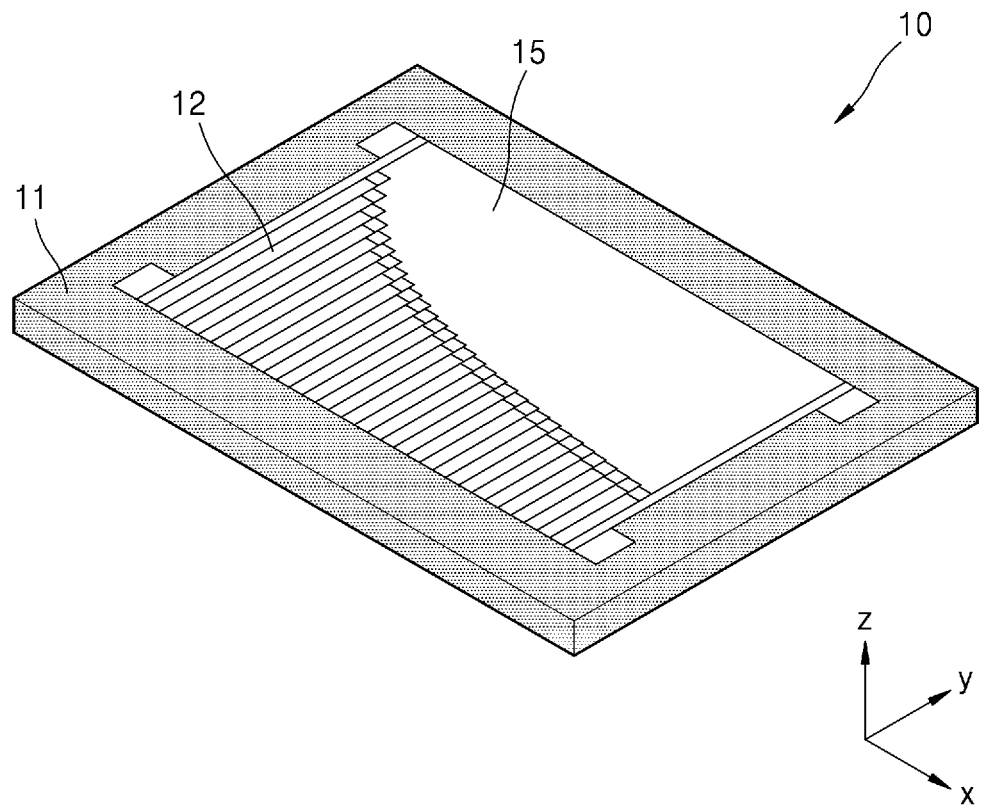
FIG. 1 illustrates an example of a general directional acoustic sensor.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

In the following descriptions, when a constituent element is disposed "above" or "on" to another constituent element, the constituent element may be only directly on the other constituent element or above the other constituent elements in a non-contact manner. As used herein, the singular forms "a," "an" and "the" are intended to include the plural forms as well, unless the context clearly indicates otherwise. Also, it will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps. The use of any and all examples, or language (e.g., "such as") provided herein, is intended merely to better illuminate the disclosure and does not pose a limitation on the scope of the disclosure unless otherwise claimed.

Figure 2:
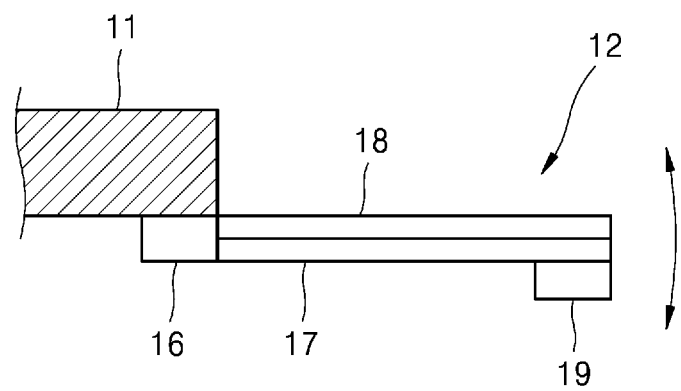
FIG. 2 is a cross-sectional view of the resonator of FIG. 1.

FIG. 1 illustrates an example of a directional acoustic sensor 10 according to an embodiment of the disclosure. FIG. 2 is a cross-sectional view of a plurality of resonators 12 of FIG. 1.

Referring to FIGS. 1 and 2, the directional acoustic sensor 10 may include a substrate 11 and the plurality of resonators 12. The substrate 11 is provided with a cavity (or an aperture) 15 formed therethrough. A silicon substrate, for example, may be used as the substrate 11, but the disclosure is not limited thereto.

The resonators 12 may be arranged in a certain shape in the cavity 15 of the substrate 11. The resonators 12 may be arranged on a plane without overlapping each other. Each of the resonators 12 may have one end portion fixed to the substrate 11 and may extend toward the cavity 15, as illustrated in FIG. 1. Each of the resonators 12 may include a fixed part 16 fixed to the substrate 11, a movable part 18 moving or vibrating in response to an input acoustic signal, and a sensing part 17 sensing a movement of the movable part 18. Furthermore, each of the resonators 12 may further include mass 19 for providing a certain amount of mass to the movable part 18.

The resonators 12 may be provided to sense, for example, acoustic frequencies of different bands. In other words, the resonators 12 may have different center frequencies. To this end, the resonators 12 may have different dimensions. For example, the resonators 12 may have different lengths, widths, or thicknesses.

The movable part 18 may be also referred to as a cantilever beam, or a cantilever arm. The movable unit 18 may be anchored at one end only while the other end may be free and unsupported.

Figure 3:
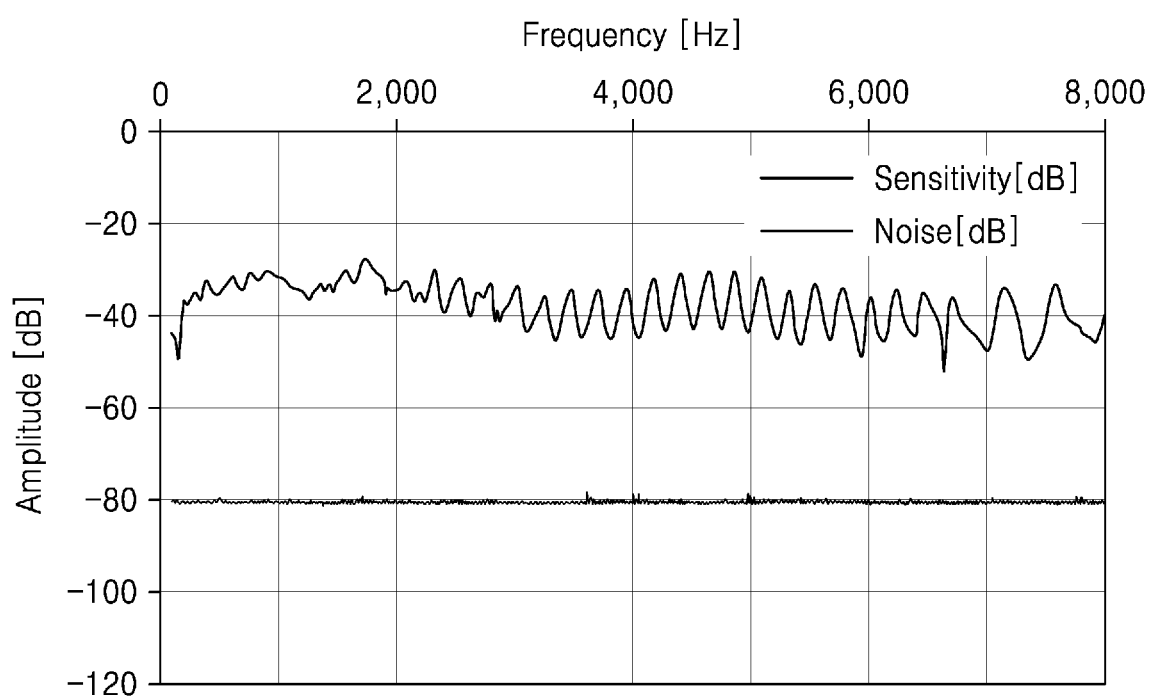
FIG. 3 illustrates an example of a result of a measurement of the frequency response characteristics of the directional acoustic sensor of FIG. 1.
Figure 4:
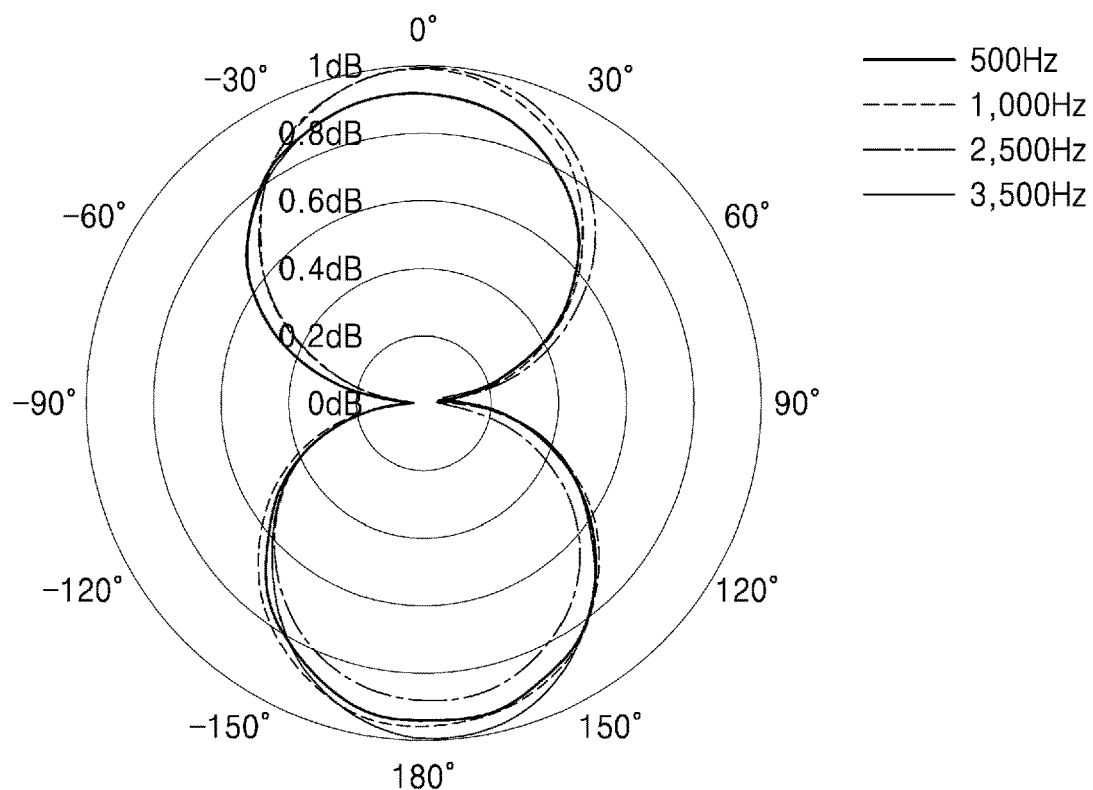
FIG. 4 illustrates an example of a result of a measurement of the directional characteristics of the directional acoustic sensor of FIG. 1.

FIG. 3 illustrates an example of a result of a measurement of the frequency response characteristics of the directional acoustic sensor 10 of FIG. 1. FIG. 4 illustrates an example of a result of a measurement of the directional characteristics of the directional acoustic sensor 10 of FIG. 1. As illustrated in FIG. 4, it may be seen that the directional acoustic sensor 10 has bi-directionality, that is, directionality in a z-axis direction of a 0° direction and a 180° direction. Although FIG. 1 illustrates a case in which the resonators 12 are provided on the substrate 11, only one resonator may be provided.

For example, as shown in FIG. 4, if the directional acoustic sensor 10 has bi-directionality in the direction of the z-axis, an attenuation ratio (a ratio of device sensitivity in a certain direction, to device sensitivity in the direction of maximum device sensitivity) may be the greatest in a direction perpendicular to the z-axis (e.g., greater than the attenuation ratio in other directions by about 20 dB or greater).

However, even when the attenuation ratio in the direction perpendicular to the z-axis is equal to or greater than 20 dB, if a distance to a noise sound source located in the direction perpendicular to the z-axis is shorter than a distance to a target sound source located in the z-axis direction, a signal-to-noise ratio (SNR) of the target sound source may be decreased more than a SNR of the noise sound source. As the sound intensity is inversely proportional to the square of a distance, when a distance to a noise sound source located in the direction perpendicular to the z-axis is shorter than a distance to a target sound source located in the z-axis direction, the sound intensity of the target sound source is reduced much greater than the sound intensity of the noise sound source input to the directional acoustic sensor.

Actually, when a TV or a smart speaker is located in a side direction of a directional acoustic sensor 10 and broadcast or music comes from the TV or the smart speaker, the directional acoustic sensor 10 may have difficulty in accurately recognizing the user's voice (e.g., the target sound source) due to the sound of broadcast and music (e.g., the noise sound source). Accordingly, to address the above matter, an improved directional acoustic sensor is needed, in which an attenuation ratio in a direction where a noise sound source is located is much greater than 20 dB.

Figure 5:
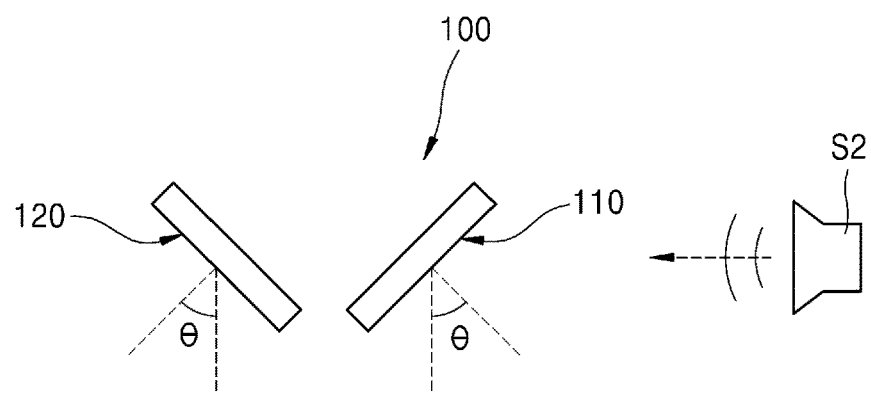
FIG. 5 schematically illustrates a directional acoustic sensor according to an embodiment.
Figure 5:
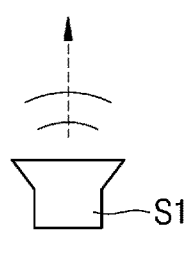
Figure 5:
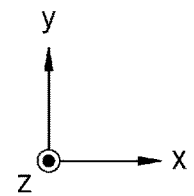
Figure 6:
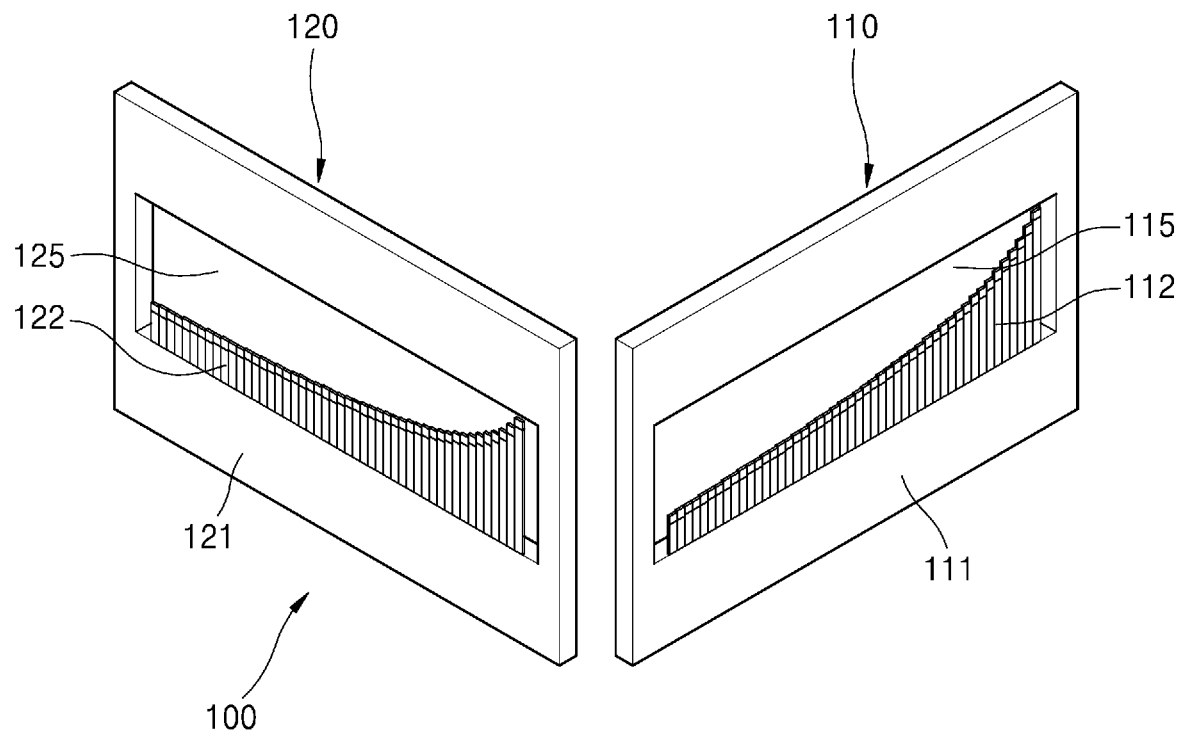
FIG. 6 is a perspective view of the first and second resonance units of FIG. 5.
Figure 7:
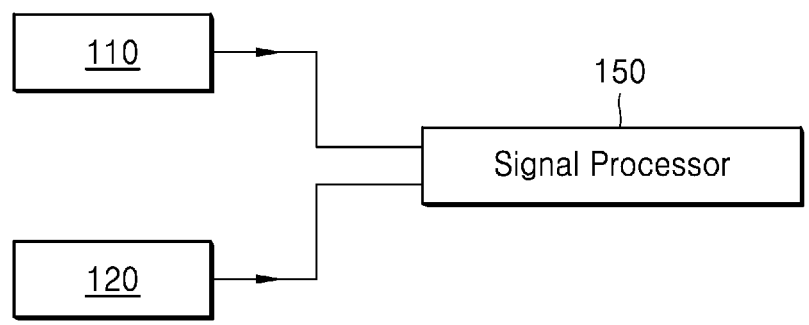
FIG. 7 is a block diagram of a schematic configuration of the directional acoustic sensor of FIG. 5.

FIG. 5 schematically illustrates a directional acoustic sensor 100 according to an embodiment, and FIG. 6 is a perspective view of first and second resonance units 110 and 120 of FIG. 5. FIG. 7 is a block diagram of a schematic configuration of the directional acoustic sensor 100 of FIG. 5.

In FIG. 5, a first sound source S1 is disposed in a front direction of the directional acoustic sensor 100, for example, a y-axis direction, and a second sound source S2 is disposed in a side direction of the directional acoustic sensor 100, for example, an x-axis direction. The first and second resonance units 110 and 120 illustrated in FIG. 5 are connected to a signal processor 150, as shown in FIG. 7, to provide acoustic signals to the signal processor 150. The first resonance unit 110 and the second resonance unit 120 may be arranged to have a certain angle (e.g., an angle less than 180 degrees) with each other.

Referring to FIGS. 5 to 7, the directional acoustic sensor 100 may include a plurality of resonance units and the signal processor 150. The plurality of resonance units may include the first and second resonance units 110 and 120 that are arranged to have different directionality. Each of the first and second resonance units 110 and 120 may have the same structure as the directional acoustic sensor 10 of FIG. 1 described above.

The first resonance unit 110 may include a first substrate 111 through which a first cavity 115 is formed and at least one first resonator 112 formed in the first cavity 115. The first resonator 112 may have one end portion fixed to the first substrate 111 and may extend toward the first cavity 115. The second resonance unit 120 may include a second substrate 121 through which a second cavity 125 is formed and at least one second resonator 122 formed in the second cavity 125. The second resonator 122 may have one end portion fixed to the second substrate 121 and may extend toward the second cavity 125.

The first and second resonance units 110 and 120 may be arranged to have different directionalities. To this end, the first and second resonance units 110 and 120 may be arranged forming a certain angle with each other. The first and second resonance units 110 and 120 may be arranged symmetrical to each other with respect to the front direction of the directional acoustic sensor 100, for example, the y-axis direction of FIG. 5. The first and second resonance units 110 and 120 each may be arranged to be inclined by a certain angle of θ with respect to the front direction of the directional acoustic sensor 100. The first and second resonance units 110 and 120 may be arranged forming an angle of 2θ with each other.

For example, the first and second resonance units 110 and 120 each may be arranged to be inclined by an angle of 45° with respect to the front direction of the directional acoustic sensor 100, and in this case, the first and second resonance units 110 and 120 may form an angle of 90° with each other. However, this is merely exemplary, and the angle between the first and second resonance units 110 and 120 may be changed variously.

The signal processor 150 may variously adjust the directional characteristics of the directional acoustic sensor 100, as described below, by using the outputs measured by the first and second resonance units 110 and 120. To this end, the signal processor 150 may obtain directional characteristics of a desired direction by calculating at least one of the sum of and the difference between an output of the first resonance unit 110 and an output of the second resonance unit 120 at a certain ratio.

Furthermore, the signal processor 150 may obtain a plurality of directional characteristics, as described below, by calculating at least one of the sum of and the difference between the output of the first resonance unit 110 and the output of the second resonance unit 120 at a certain ratio, and may attenuate an acoustic signal in a specific direction by using the directional characteristics.

Figure 8:
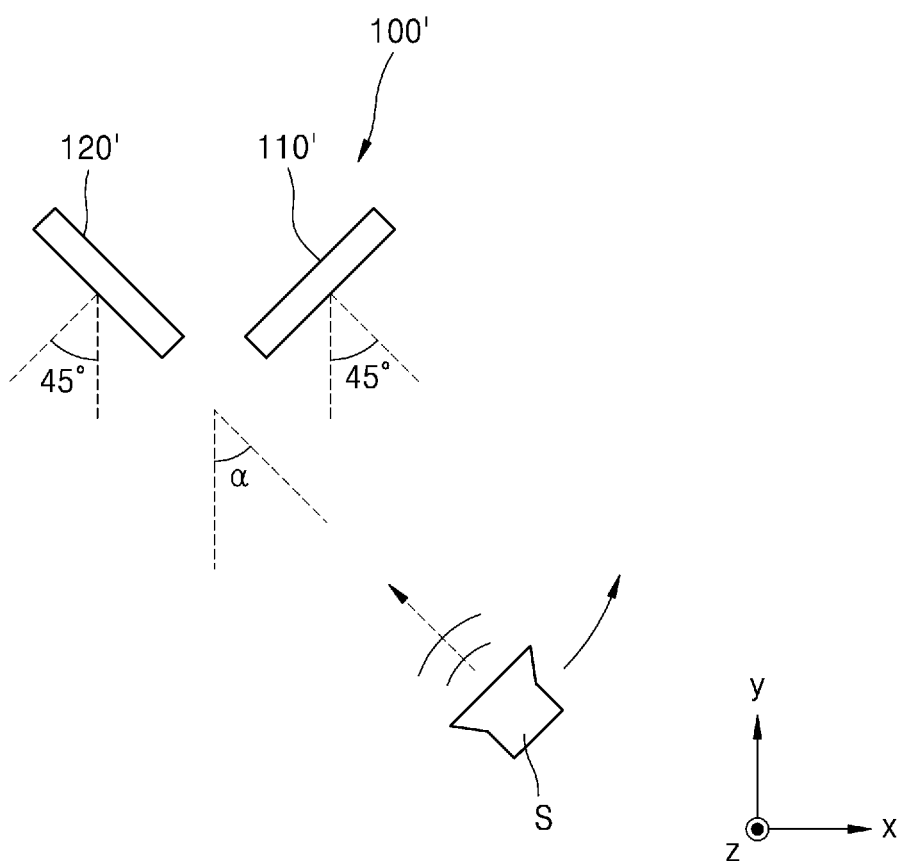
FIG. 8 illustrates an exemplary directional acoustic sensor manufactured as a simulation test model.

FIG. 8 illustrates an exemplary directional acoustic sensor 100' manufactured as a simulation test model. The directional acoustic sensor 100' of FIG. 8 is the same as the directional acoustic sensor 100 of FIG. 5 in that the first resonance unit 110' includes the single first resonator and the second resonator unit 120' includes the single second resonator. Although not illustrated in FIG. 8, the first and second resonance units 110' and 120' are connected to the signal processor 150.

Referring to FIG. 8, the first and second resonance units 110' and 120' each are arranged to be inclined by an angle of 45° with respect to the front direction of the directional acoustic sensor 100', for example, the y-axis direction, and the first and second resonance units 110' and 120' are arranged to be inclined by an angle of 90° with each other. A sound source S for generating sound is arranged to be inclined by an angle of α with respect to the front direction (e.g., the y-axis direction) of the directional acoustic sensor 100'.

Figure 9:
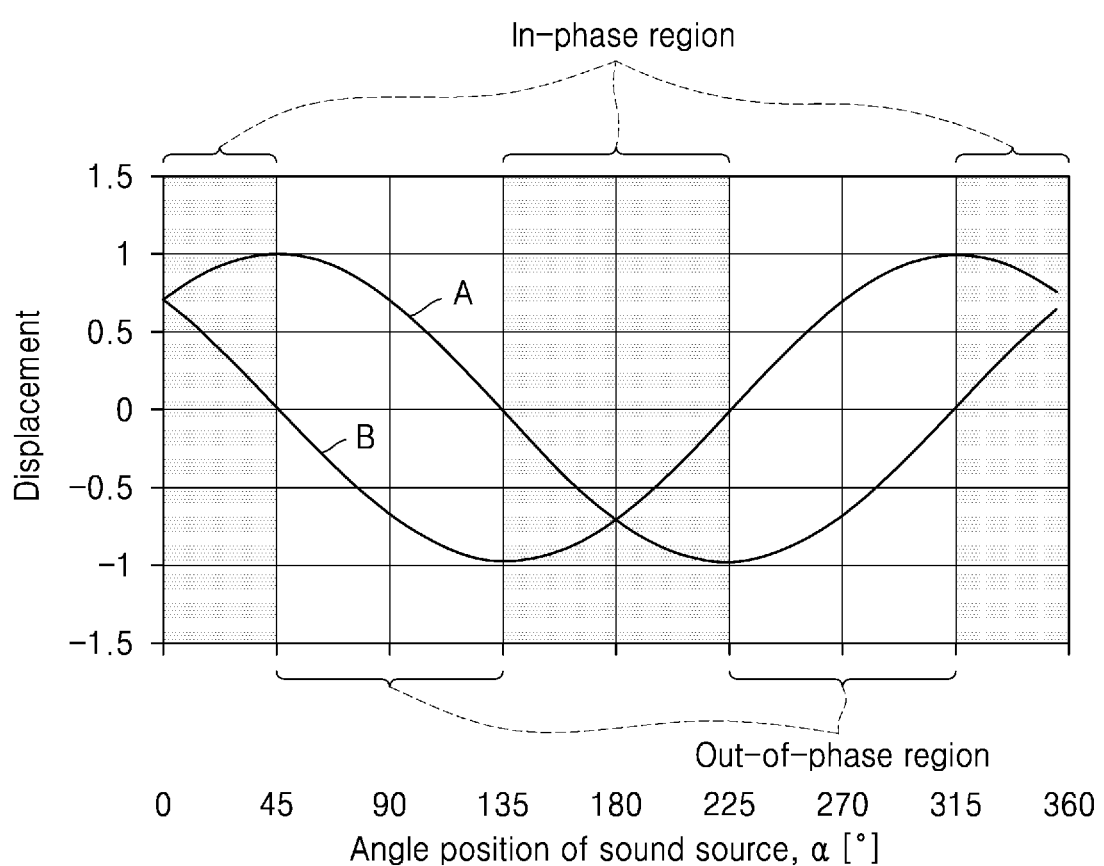
FIG. 9 illustrates a simulation result illustrating displacements A and B of resonators according to the position of a sound source, in the directional acoustic sensor of FIG. 8.

FIG. 9 illustrates a simulation result illustrating displacements A and B of sound waves of the resonators with regard to their equilibrium positions according to the position of the sound source S, in the directional acoustic sensor 100' of FIG. 8. FIG. 9 illustrates displacements of the resonators generated as the sound source S moves counterclockwise in the directional acoustic sensor 100' of FIG. 8. In FIG. 9, "A" denotes a displacement of a sound particle that is generated from the first resonator of the first resonance unit 110.' "B" denotes a displacement of a sound particle that is generated from the second resonator of the second resonance unit 120'. The displacements A and B show measurements of distance of the movements of the sound particles from their equilibrium positions (e.g., displacement positon "0" in FIG. 9) as the sound particles propagate from the first resonance unit 110' and the second resonance unit 120' to a destination.

Referring to FIG. 9, when an angle α at which the sound source S is located is 0°-45°, 135°-225°, and 315°-360°, the first and second resonators move in-phase, and when the angle α at which the sound source S is located is 45°-135° and 225°-315°, the first and second resonators move out-of-phase. In this state, the in-phase movement of the first and second resonators may signify that the first and second resonators are displaced in the same direction with respect to the original position, and the out-of-phase movement of the first and second resonators may signify that the first and second resonators are displaced in the opposite directions with respect to the original position.

As such, it may be seen that, when the sound source S is located in the front direction of the directional acoustic sensor 100', for example, the y-axis direction of FIG. 8, the first and second resonators move in-phase, and when the sound source S is located in the side direction of the directional acoustic sensor 100', for example, the x-axis direction of FIG. 8, the first and second resonators move out-of-phase.

Figure 10:
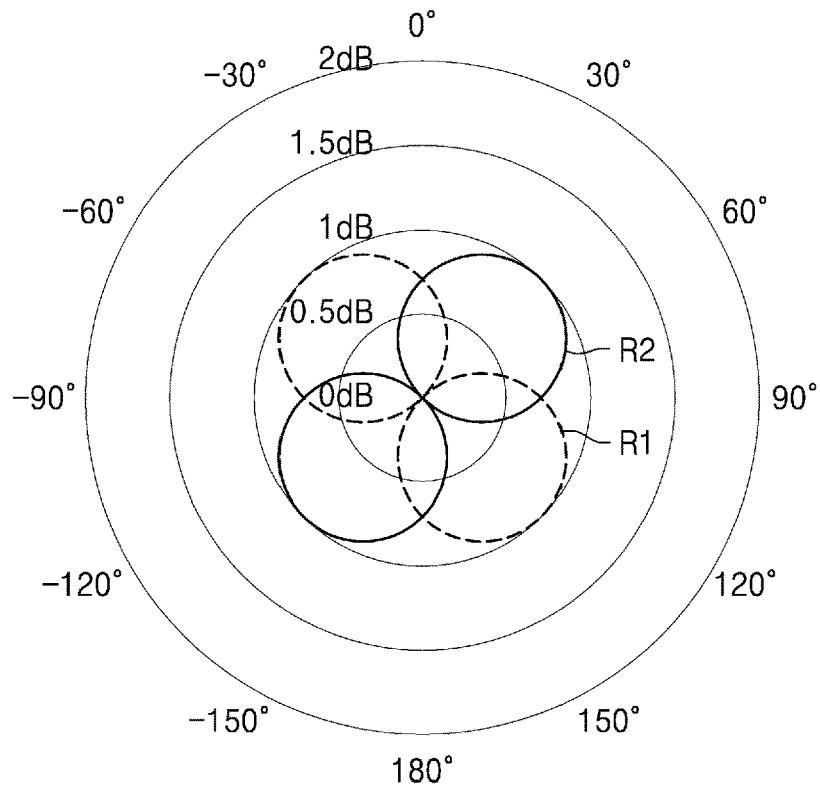
FIG. 10 illustrates a simulation result illustrating the directional characteristics R1 and R2 of the first and second resonance units, in the directional acoustic sensor of FIG. 8.

FIG. 10 illustrates a simulation result illustrating the directional characteristics R1 and R2 of the first and second resonance units 110' and 120', in the directional acoustic sensor 100' of FIG. 8. In FIG. 10, "R1" denotes the directional characteristics of the first resonance unit 110' and "R2" denotes the directional characteristics of the second resonance unit 120'.

Referring to FIG. 10, it may be seen that the first and second resonance units 110' and 120' have different directionalities. In detail, the first resonance unit 110' may have directionality of a −45° direction, for example, a direction between a +y-axis direction and a −x-axis direction of FIG. 8, and a 135° direction, for example, a direction between a −y-axis direction and a +x-axis direction of FIG. 8. The second resonance unit 120' may have directionality of a 45° direction, for example, a direction between the +y-axis direction and the +x-axis direction of FIG. 8 and a −135° direction, for example, a direction between the −y-axis direction and the −x-axis direction of FIG. 8.

Figure 11:
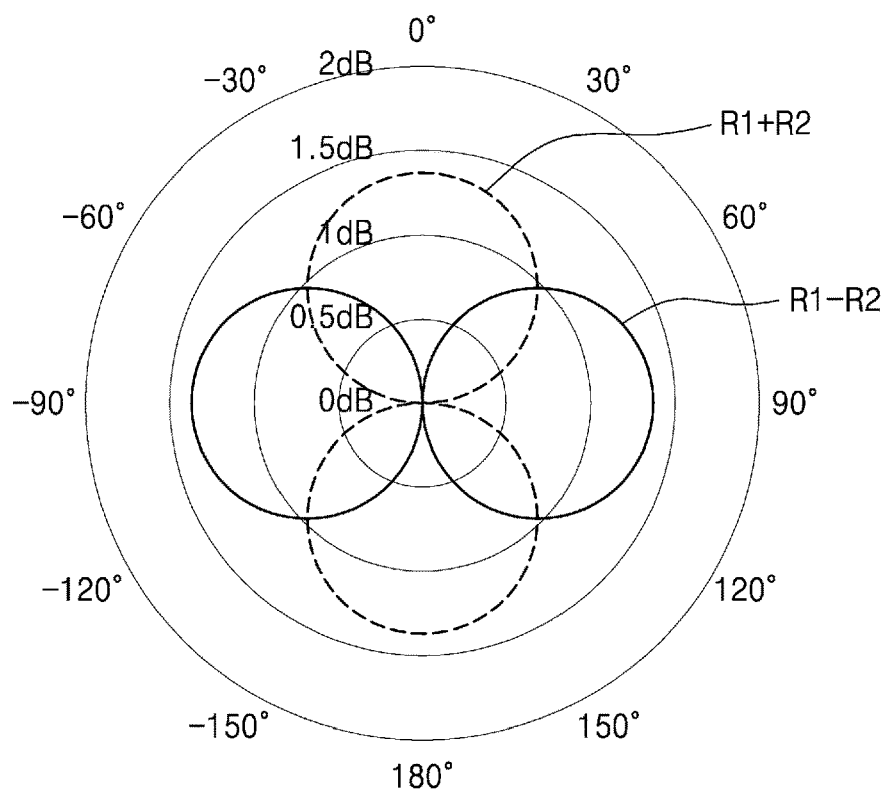
FIG. 11 illustrates a simulation result illustrating the directional characteristics R1+R2 and R1−R2 obtained by calculating the sum of and the difference between the outputs of the first and second resonance units, in the directional acoustic sensor of FIG. 8.

FIG. 11 illustrates a simulation result illustrating the directional characteristics R1+R2 and R1-R2 obtained by calculating the sum of and the difference between the outputs of the first and second resonance units 110' and 120', in the directional acoustic sensor 100' of FIG. 8. In FIG. 11, "R1+R2" denotes the directional characteristics obtained as the signal processor 150 calculates the sum of the output of the first resonance unit 110' and the output of the second resonance unit 120', and "R1-R2" denotes the directional characteristics obtained as the signal processor 150 calculates the difference between the output of the first resonance unit 110' and the output of the second resonance unit 120'.

Referring to FIG. 11, it may be seen that the directional characteristics obtained by calculating the sum of the output of the first resonance unit 110' and the output of the second resonance unit 120 have directionality in the front direction of the directional acoustic sensor 100', for example, the y-axis direction of FIG. 8, and the directional characteristics obtained by calculating the difference between the output of the first resonance unit 110' and the output of the second resonance unit 120' have directionality of the side direction of the directional acoustic sensor 100', for example, the x-axis direction of FIG. 8.

Figure 12:
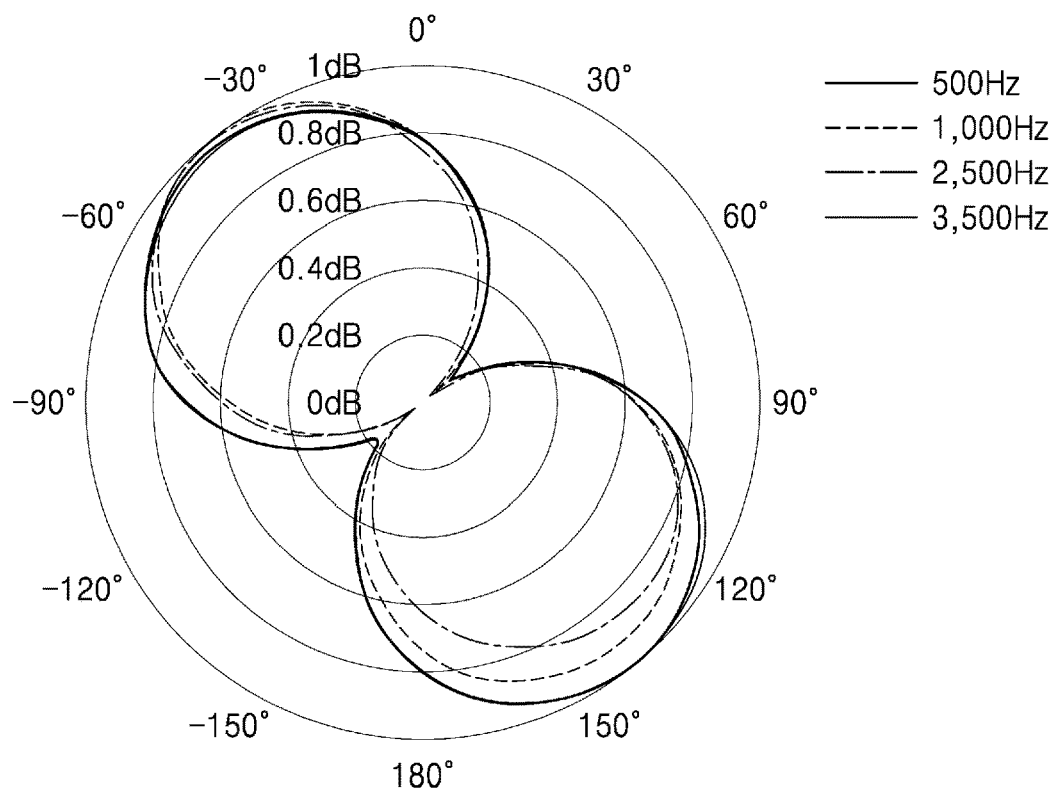
FIG. 12 illustrates a test result of a measurement of the directional characteristics of the first resonance unit, in the directional acoustic sensor of FIG. 5 according to an example embodiment.
Figure 13:
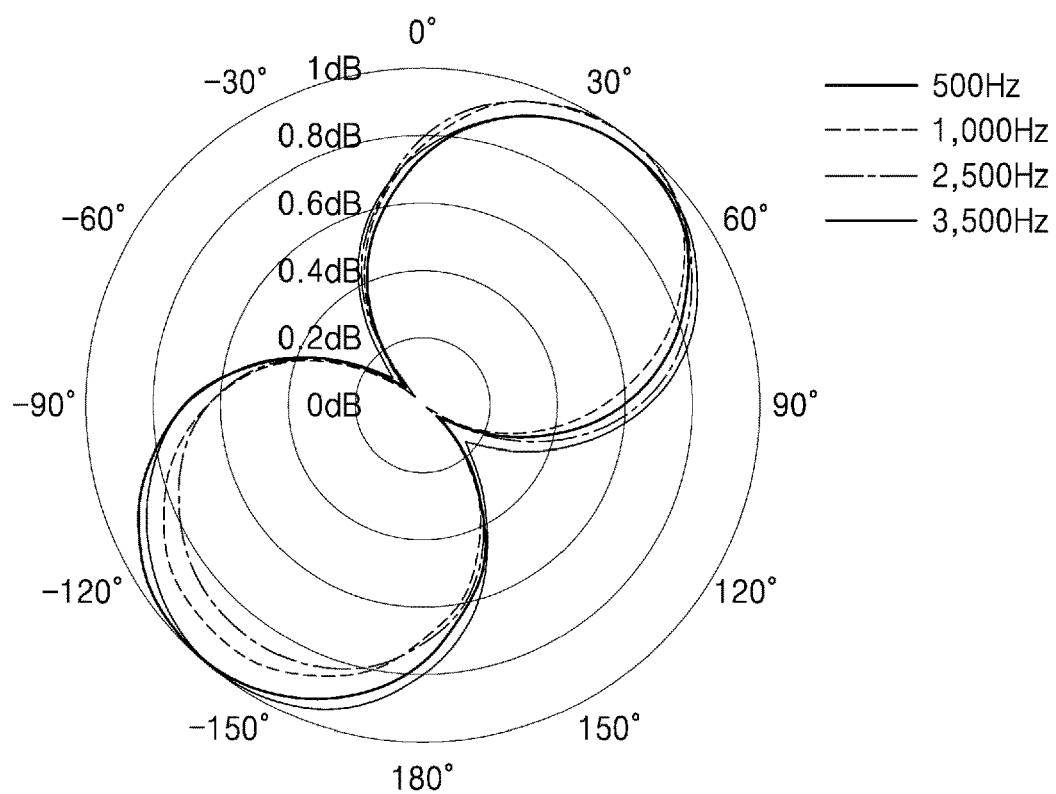
FIG. 13 illustrates a test result of a measurement of the directional characteristics of the second resonance unit, in the directional acoustic sensor of FIG. 5 according to an example embodiment.

FIGS. 12 and 13 illustrate test results of measurements of the directional characteristics of the first and second resonance units 110 and 120, in the directional acoustic sensor 100 of FIG. 5 according to an example embodiment. In this state, the first and second resonance units 110 and 120 are arranged to be inclined by an angle of 45° with respect to the front direction of the directional acoustic sensor 100, for example, the y-axis direction of FIG. 5, and thus the first and second resonance units 110 and 120 are arranged forming an angle of 90° with each other.

FIG. 12 illustrates a test result of a measurement of the directional characteristics of the first resonance unit 110 for each of four frequencies, in the directional acoustic sensor 100 of FIG. 5 according to an example embodiment. Referring to FIG. 12, it may be seen that the first resonance unit 110 has directionality of a −45° direction, for example, a direction between a +y-axis direction and a −x-axis direction of FIG. 5 and a 135° direction, for example, a direction between a −y-axis direction and a +x-axis direction of FIG. 5.

FIG. 13 illustrates a test result of a measurement of the directional characteristics of the second resonance unit 120 for each of four frequencies, in the directional acoustic sensor 100 of FIG. 5 according to an example embodiment. Referring to FIG. 13, it may be seen that the second resonance unit 120 has directionality of a 45° direction, for example, a direction between the +y-axis direction and the +x-axis direction of FIG. 5 and a −135° direction, for example, a direction between the −y-axis direction and the −x-axis direction of FIG. 5.

Figure 14:
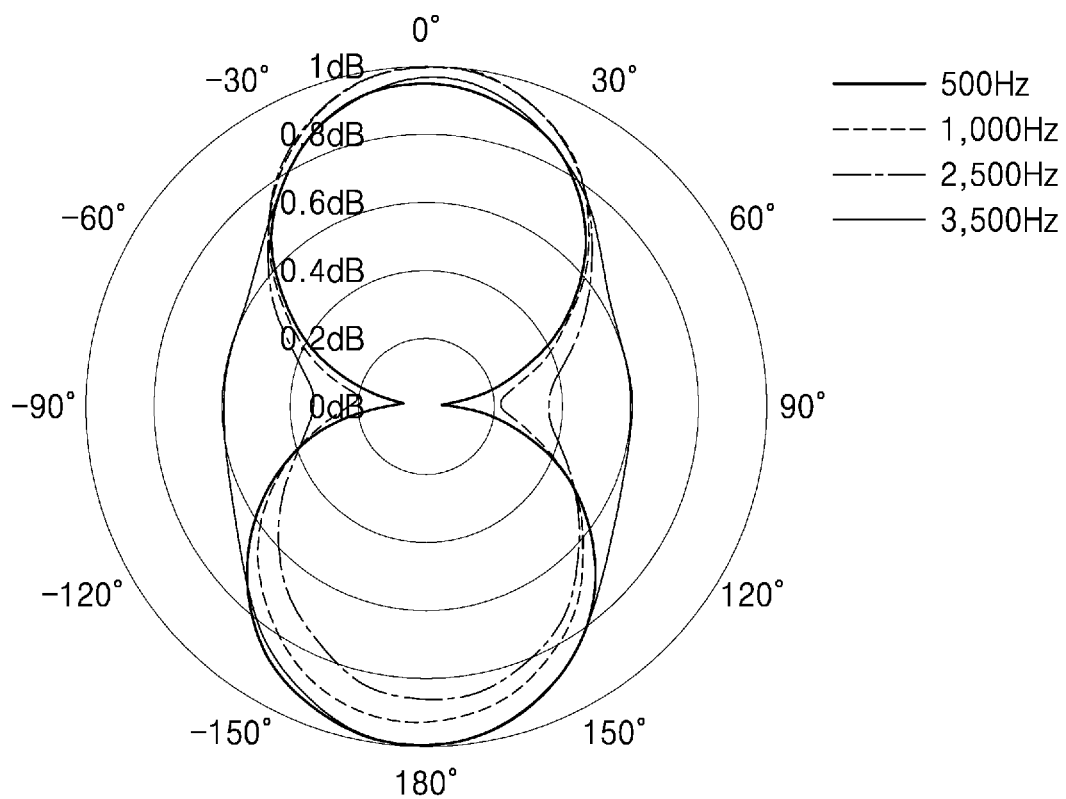
FIG. 14 illustrates a test result of a measurement of the directional characteristics obtained by calculating the sum of the output of the first resonant unit and the output of the second resonant unit, in the directional acoustic sensor of FIG. 5 according to an example embodiment.

FIG. 14 illustrates a test result of a measurement of the directional characteristics obtained by calculating the sum of the output of the first resonant unit 110 and the output of the second resonant unit 120, in the directional acoustic sensor 100 of FIG. 5 according to an example embodiment. FIG. 14 illustrates the directional characteristics obtained as the signal processor 150 calculates the sum of the output of the first resonance unit 110 and the output of the second resonance unit 120. Referring to FIG. 14, it may be seen that the directional characteristics obtained by calculating the sum of the output of the first resonance unit 110 and the output of the second resonance unit 120 have directionality of the front direction of the directional acoustic sensor 100, for example, the y-axis direction of FIG. 8.

Figure 15:
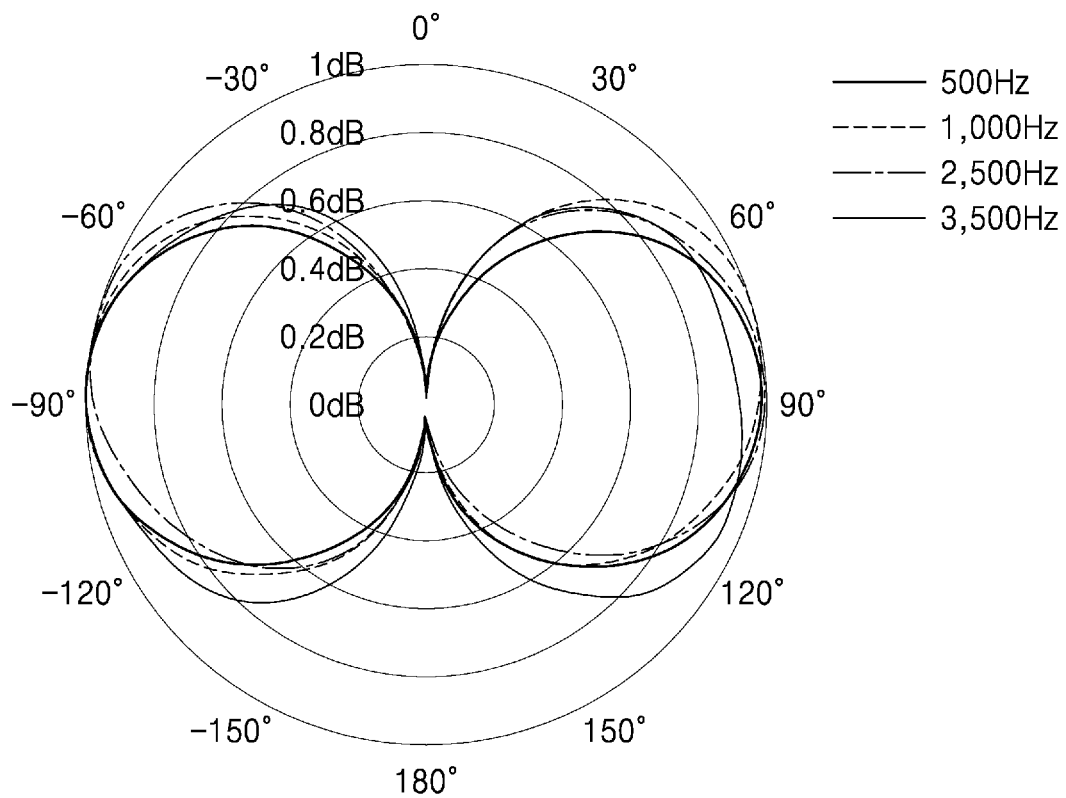
FIG. 15 illustrates a test result of a measurement of the directional characteristics obtained by calculating the difference between the output of the first resonant unit and the output of the second resonant unit, in the directional acoustic sensor of FIG. 5 according to an example embodiment.

FIG. 15 illustrates a test result of a measurement of the directional characteristics obtained by calculating the difference between the output of the first resonant unit 110 and the output of the second resonant unit 120, in the directional acoustic sensor 100 of FIG. 5 according to an example embodiment. FIG. 15 illustrates the directional characteristics obtained as the signal processor 150 calculates the difference between the output of the first resonance unit 110 and the output of the second resonance unit 120. Referring to FIG. 15, it may be seen that the directional characteristics obtained by calculating the difference between the output of the first resonance unit 110 and the output of the second resonance unit 120 have directionality of the side direction of the directional acoustic sensor 100, for example, the x-axis direction of FIG. 8.

As such, in the directional acoustic sensor 100 according to the present embodiment, as the signal processor 150 calculates at least one of the sum of and the difference between the output of the first resonance unit 110 and the output of the second resonance unit 120, the directional acoustic sensor 100 may adjust the directional characteristics to have directionality of the front direction or the side direction.

Figure 16:
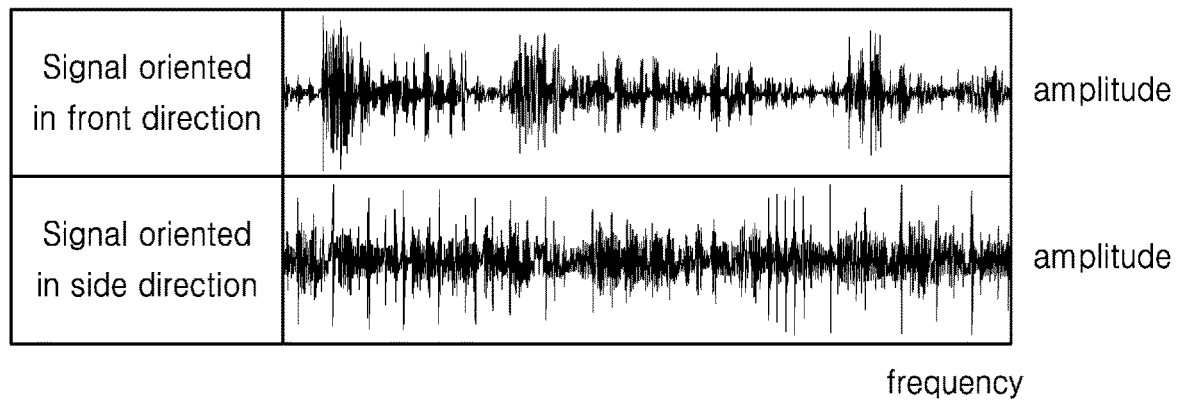
FIG. 16 illustrates an example of acoustic signals obtained when oriented in the front direction and when oriented in the side direction, in the directional acoustic sensor of FIG. 5 according to an example embodiment.

FIG. 16 illustrates an example of acoustic signals obtained when oriented in the front direction and when oriented in the side direction, in the directional acoustic sensor 100 of FIG. 5 according to an example embodiment. In this state, the acoustic signal obtained when oriented in the front direction may be obtained by using the directional characteristics obtained as the signal processor 150 calculates the sum of the output of the first resonance unit 110 and the output of the second resonance unit 120, as illustrated in FIG. 14. The acoustic signal obtained when oriented in the side direction may be obtained by using the directional characteristics obtained as the signal processor 150 calculates the difference between the output of the first resonance unit 110 and the output of the second resonance unit 120, as illustrated in FIG. 15.

In the above description, when calculating the sum of or the difference between the output of the first resonance unit 110 and the output of the second resonance unit 120, a ratio of the output of the second resonance unit 120 to the output of the first resonance unit 110 is 1. However, the disclosure is not limited thereto, and the ratio of the output of the second resonance unit 120 to the output of the first resonance unit 110 may be any value other than 1.

In detail, when the outputs of the first and second resonance units 110 and 120 are G1 and G2, respectively, and a ratio of the output G2 of the second resonance unit 120 to the output G1 of the first resonance unit 110 is k, the signal processor 150 may calculate the sum of the output G1 of the first resonance unit 110 and the output G2 of the second resonance unit 120 by using a mathematical expression "G1+kG2", and the difference between the output G1 of the first resonance unit 110 and the output G2 of the second resonance unit 120 may be calculated by using a mathematical expression "G1−kG2", and accordingly, as described below, the directional characteristics may be adjusted such that the directional acoustic sensor 100 has directionality of a desired direction. The ratio k may be also referred to as a weight that is applied to the value of the output G1 or the output G2, in calculating the sum or the difference.

FIGS. 17A to 17E illustrate examples of the directional characteristics obtained by calculating the sum of or the difference between the output G1 of the first resonance unit 110 and the output G2 of the second resonance unit 120 according to the ratio k of the output G2 of the second resonance unit 120 to the output G1 of the first resonance unit 110, in the directional acoustic sensor 100 of FIG. 5.

Figure 17A:
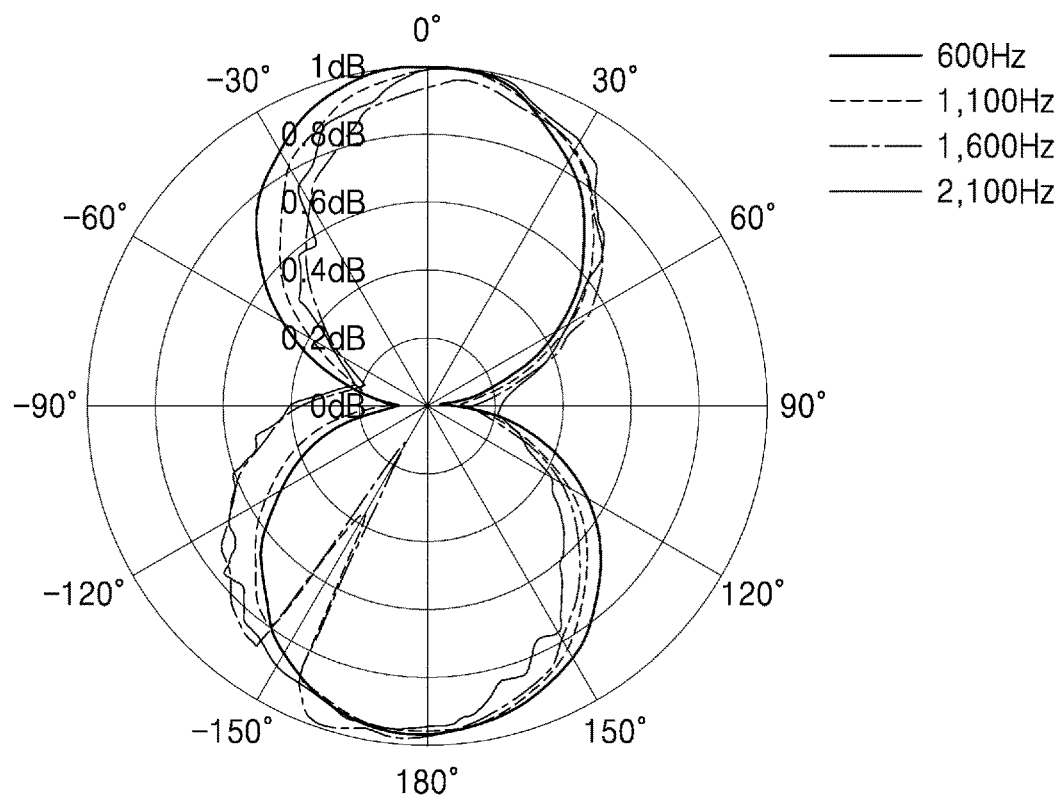
FIGS. 17A to 17E illustrate examples of directional characteristics obtained by calculating the sum of and the difference between the outputs of the first and second resonance units by changing a ratio of the output of the second resonance unit to the output of the first resonance unit, in the directional acoustic sensor of FIG. 5.

FIG. 17A illustrates the directionality obtained from a calculation expression (G1+kG2) indicating the sum of the output G1 of the first resonance unit 110 and the output G2 of the second resonance unit 120 when the ratio k of the output G2 of the second resonance unit 120 to the output G1 of the first resonance unit 110 is 1. In this case, the directional acoustic sensor 100 may have directionality of the front direction, for example, the y-axis direction of FIG. 8.

Figure 17B:
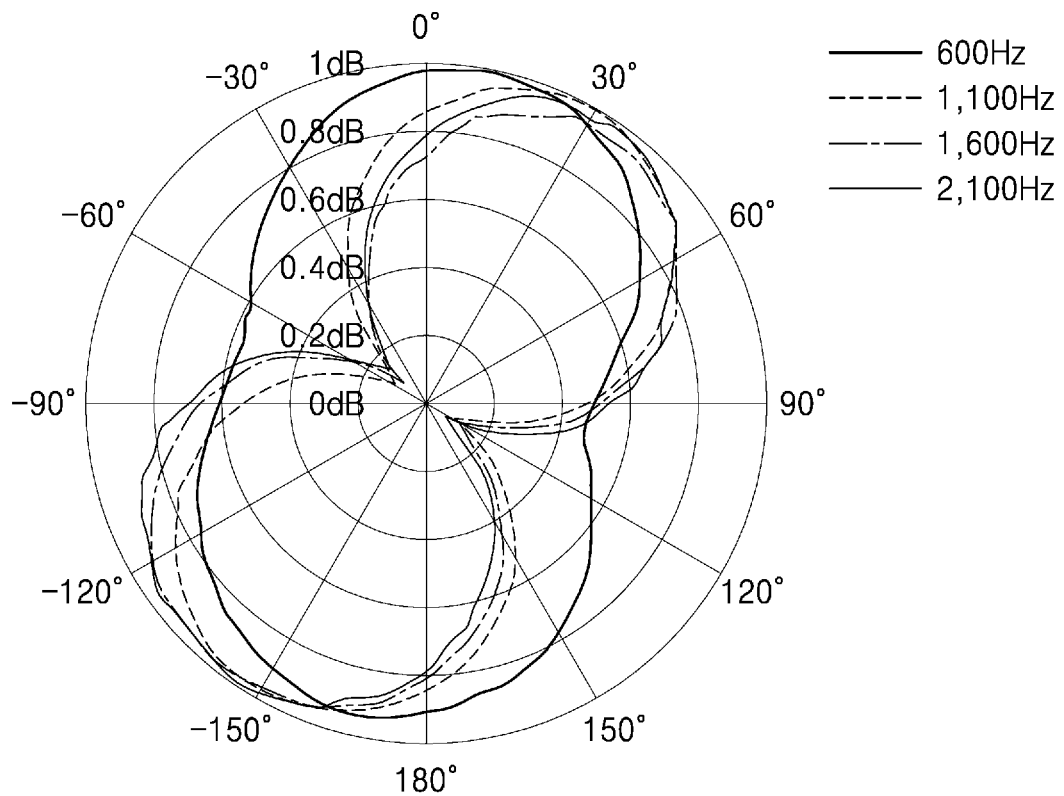
Figure 17C:
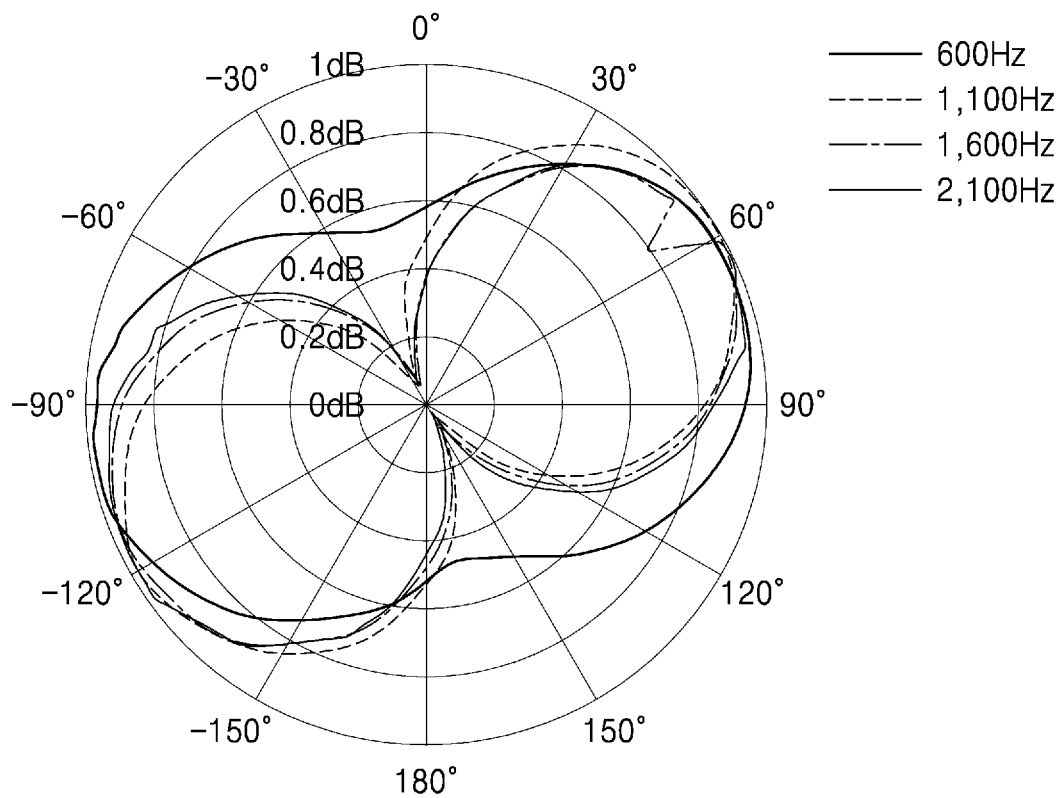

FIG. 17B illustrates the directionality obtained from the calculation expression (G1+kG2) indicating the sum of the output G1 of the first resonance unit 110 and the output G2 of the second resonance unit 120 when the ratio k of the output G2 of the second resonance unit 120 to the output G1 of the first resonance unit 110 is 0.5. FIG. 17C illustrates the directionality obtained from the calculation expression (G1+kG2) indicating the sum of the output G1 of the first resonance unit 110 and the output G2 of the second resonance unit 120 when the ratio k of the output G2 of the second resonance unit 120 to the output G1 of the first resonance unit 110 is 0.

Figure 17D:
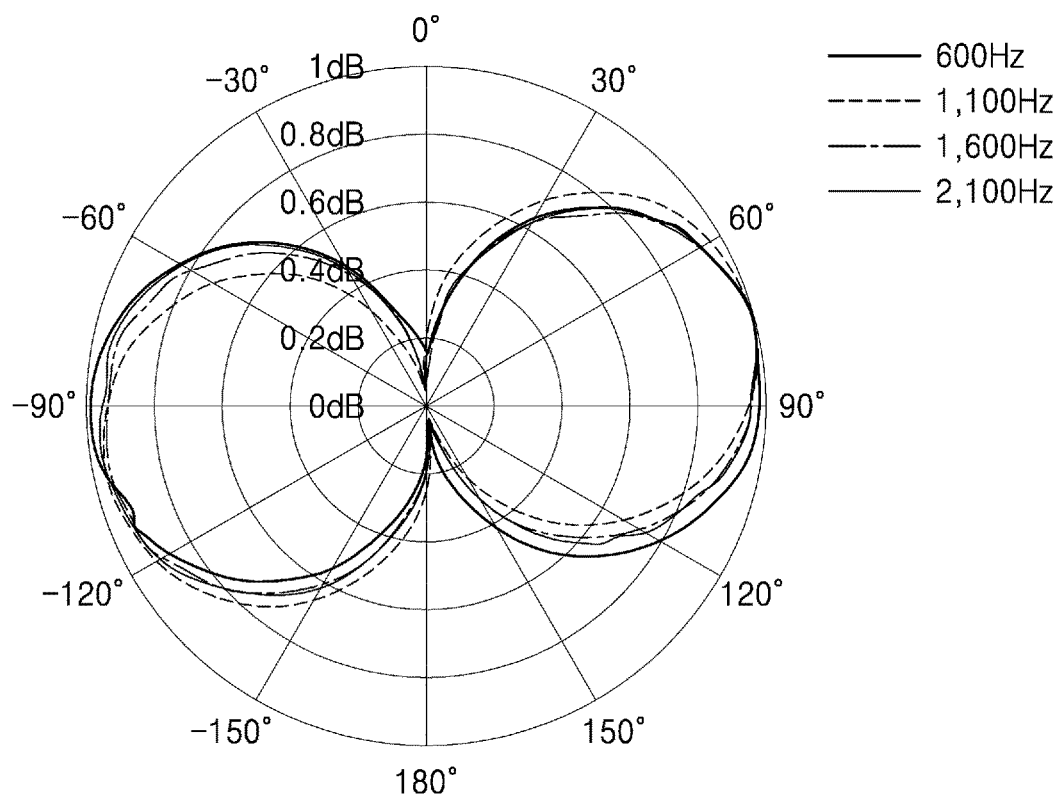

FIG. 17D illustrates the directionality obtained from a calculation expression (G1−kG2) indicating the difference between the output G1 of the first resonance unit 110 and the output G2 of the second resonance unit 120 when the ratio k of the output G2 of the second resonance unit 120 to the output G1 of the first resonance unit 110 is 0.5.

Figure 17E:
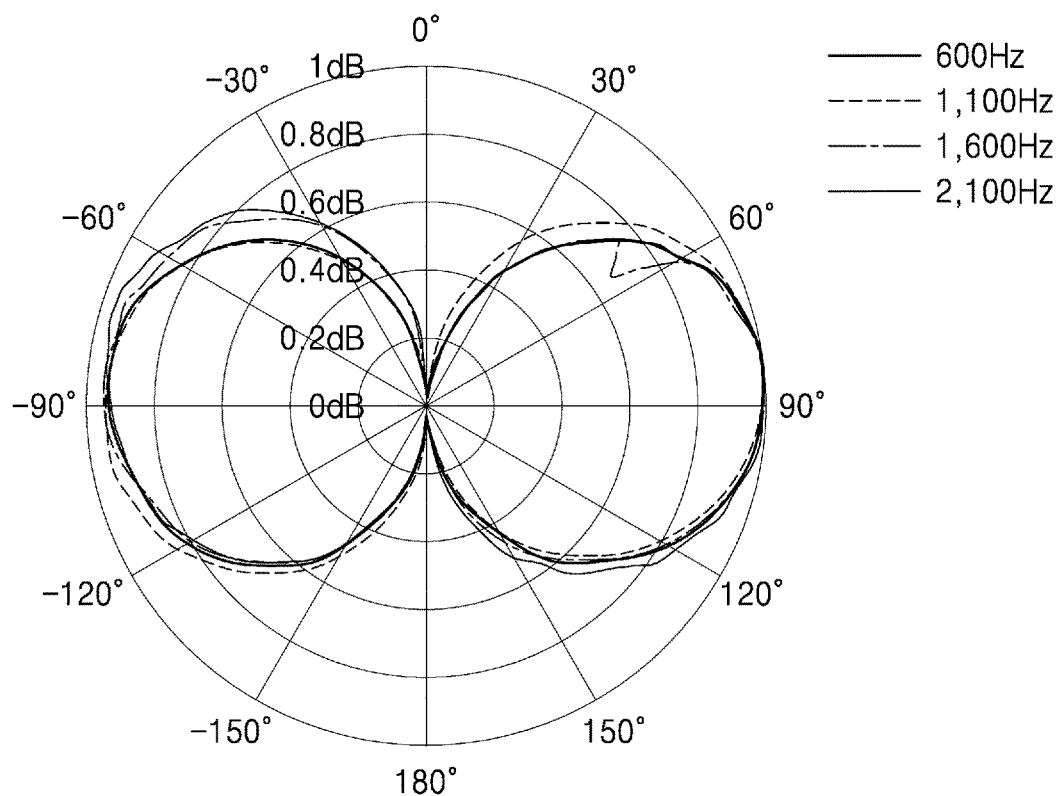

FIG. 17E illustrates the directionality obtained from a calculation expression (G1−kG2) indicating the difference between the output G1 of the first resonance unit 110 and the output G2 of the second resonance unit 120 when the ratio k of the output G2 of the second resonance unit 120 to the output G1 of the first resonance unit 110 is 1. In this case, it may be seen that the directional acoustic sensor 100 has directionality of the side direction, for example, the x-axis direction of FIG. 8.

As such, according to the present embodiment, the signal processor 150 calculates the sum of or the difference between the output G1 of the first resonance unit 110 and the output G2 of the second resonance unit 120, and by adjusting in the calculation the ratio k of the output G2 of the second resonance unit 120 to the output G1 of the first resonance unit 110, a user may implement the directional acoustic sensor 100 having directionality of a desired direction.

In the above description, a case in which the directional acoustic sensor 100 includes two resonance units, that is, the first and second resonance units 110 and 120, arranged to have different directionalities is described. However, the disclosure is not limited thereto, and the directional acoustic sensor 100 may include three or more resonance units arranged to have different directionalities.

As described above, as the directional acoustic sensor 10 of FIG. 1 has bi-directionality, when the z-axis direction is set to be the front direction, the attenuation ratio is the greatest in the side direction, for example, about 20 dB or greater. However, even when the attenuation ratio in the side direction is greater than 20 dB, when a distance to a noise sound source located in the side direction is shorter than a distance to a target sound source located in the front direction, the SNR is lowered.

For example, when a TV or a smart speaker is located in a side direction of the general directional acoustic sensor 10 of FIG. 1 and broadcast or music comes from the TV or the smart speaker, the directional acoustic sensor may have difficulty in accurately recognizing the user's voice. To address the above matter, a directional acoustic sensor that is improved to have an attenuation ratio in a direction where a noise sound source is located is much greater than 20 dB is needed.

In the directional acoustic sensor 100 according to an example embodiment, in addition to the function that the signal processor 150 adjusts the directional characteristics, a function of attenuating an acoustic signal in a specific direction may be additionally performed.

Figure 18:
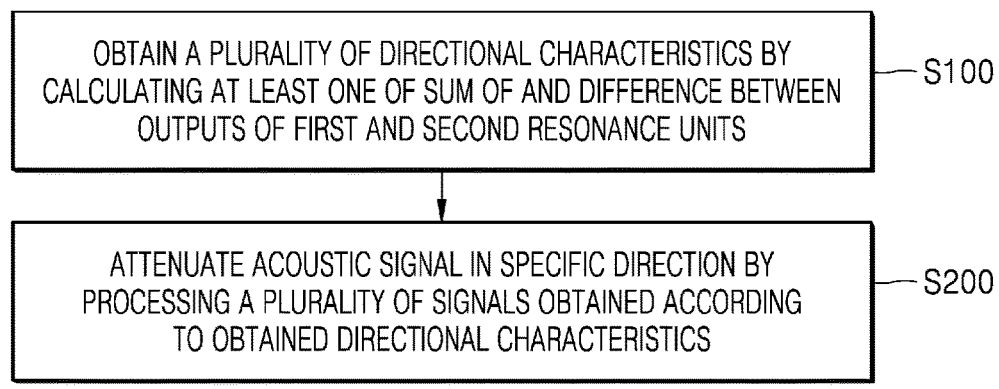
FIG. 18 is a flowchart of a method of attenuating an acoustic signal in a specific direction, which is performed by a signal processor of the directional acoustic sensor according to an example embodiment.

FIG. 18 is a flowchart of a method of attenuating an acoustic signal in a specific direction, which is performed by the signal processor 150 of the directional acoustic sensor 100 according to an example embodiment.

Referring to FIG. 18, first, the signal processor 150 obtains a plurality of directional characteristics by calculating at least one of the sum of and the difference between the outputs of the first and second resonance units 110 and 120 at a certain ratio in operation S100. Next, the signal processor 150 attenuates the acoustic signal in a specific direction by processing a plurality of signals obtained according to the obtained directional characteristics in operation S200).

In the following description, a method in which the signal processor 150 attenuates an acoustic signal generated from a noise sound source located in a specific direction by using the directional acoustic sensor 100 of FIG. 5 according to an example embodiment is described.

In FIG. 5, the first sound source S1 located in the first direction (e.g., the front direction or the y-axis direction) of the directional acoustic sensor 100 may be a target sound source (e.g., a user), and the second sound source S2 located in the second direction (e.g, the side direction or the x-axis direction) of the directional acoustic sensor 100 may be a noise sound source (e.g., a TV speaker or a smart speaker).

In the directional acoustic sensor 100 of FIG. 5 according to an example embodiment, the signal processor 150 may obtain front directional characteristics and side directional characteristics, and an acoustic signal input to the directional acoustic sensor 100 from the second sound source S2 that is a noise sound source may be removed by using the obtained front directional characteristics and side directional characteristics. The above is described below in detail.

First, the signal processor 150 may obtain front directional characteristics and side directional characteristics by calculating the sum of and the difference between the output of the first resonance unit 110 and the output of the second resonance unit 120 at a certain ratio. In detail, the front directional characteristics may be obtained by calculating the sum of the output of the first resonance unit 110 and the output of the second resonance unit 120, and the obtained front directional characteristics are exemplarily illustrated in FIG. 14. FIG. 14 illustrates a result of the calculation by setting a ratio of the output of the second resonance unit 120 to the output of the first resonance unit 110 to be 1. The signal processor 150 may adjust the ratio of the output of the second resonance unit 120 to the output of the first resonance unit 110 to be less than 1. For example, the signal processor 150 may set a value of a subtraction m, which is to be subtracted from the value 1, in proportion to an angle to be displaced from the front direction, and may adjust the ratio of the output of the second resonance unit 120 to the output of the first resonance unit 110 to a result value of subtracting the value m from the value 1.

The side directional characteristics may be obtained by calculating the difference between the output of the first resonance unit 110 and the output of the second resonance unit 120, and the obtained side directional characteristics are exemplarily illustrated in FIG. 15. FIG. 15 illustrates a result of the calculation by setting a ratio of the output of the second resonance unit 120 to the output of the first resonance unit 110 to be 1. The signal processor 150 may adjust the ratio of the output of the second resonance unit 120 to the output of the first resonance unit 110 to be less than 1. For example, the signal processor 150 may set a value of a subtraction n, which is to be subtracted from the value 1, in proportion to an angle to be displaced from the side direction, and may adjust the ratio of the output of the second resonance unit 120 to the output of the first resonance unit 110 to a result value of subtracting the value n from the value 1.

Next, the signal processor 150 may attenuate an acoustic signal generated in the side direction by processing a first signal obtained when oriented in the front direction and a second signal obtained when oriented in the side direction.

A first signal SG1 obtained by the directional acoustic sensor 100 when oriented in the front direction is calculated. In this state, for example, when the first signal SG1 has a ratio of about 10:1 between an acoustic signal U generated from the first sound source S1 and an acoustic signal T generated from the second sound source S2, the first signal SG1 may be calculated by Equation (1) below.

$$SG1 = U + 0.1T \tag{1}$$

A second signal SG2 obtained by the directional acoustic sensor 100 when oriented in the side direction is calculated. In this state, for example, when the second signal SG2 has a ratio of about 10:1 between the acoustic signal T generated from the second sound source S2 and the acoustic signal U generated from the second sound source S1 and, the second signal SG1 may be calculated by Equation (2) below.

$$SG2 = T + 0.1U \tag{2}$$

Next, as the second signal SG2 obtained when oriented in the side direction and multiplied by $\frac{1}{10}$ is subtracted from the first signal SG1 obtained when oriented in the front direction, a signal SG processed by the signal processor 150 may be obtained as in Equation (3) below.

$$SG = SG1 - 0.1 SG2 = 0.99U \tag{3}$$

In Equation (3), the signal SG processed by the signal processor 150 does not include the acoustic signal T generated from the second sound source S2.

As such, as the signal processor 150 processes acoustic signals obtained by using the front directional characteristics and the side directional characteristics, the acoustic signal generated from the second sound source S2 that is a noise sound source located in the side direction may be prevented from being input to the directional acoustic sensor.

Figure 19:
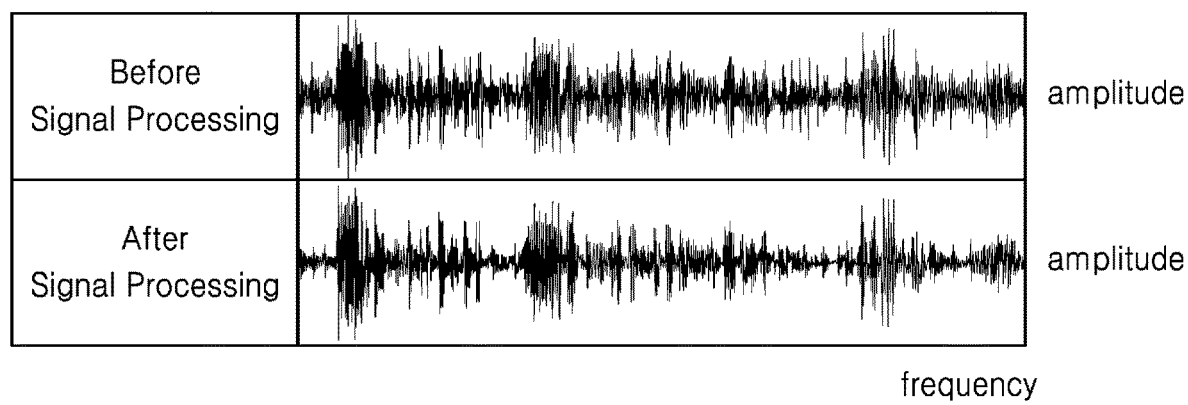
FIG. 19 illustrates an example of a comparison of acoustic signals obtained before and after the signal processor attenuates an acoustic signal in a side direction, in the directional acoustic sensor of FIG. 5 according to an example embodiment.

FIG. 19 illustrates an example of a comparison of acoustic signals obtained before and after the signal processor 150 attenuates an acoustic signal in a side direction, in the directional acoustic sensor 100 of FIG. 5 according to an example embodiment. Referring to FIG. 19, as the signal processor 150 processes signals by using the front directional characteristics and the side directional characteristics, the acoustic signal generated from the second sound source S2 located in the side direction may be prevented from being input to the directional acoustic sensor or reduced much.

Figure 20:
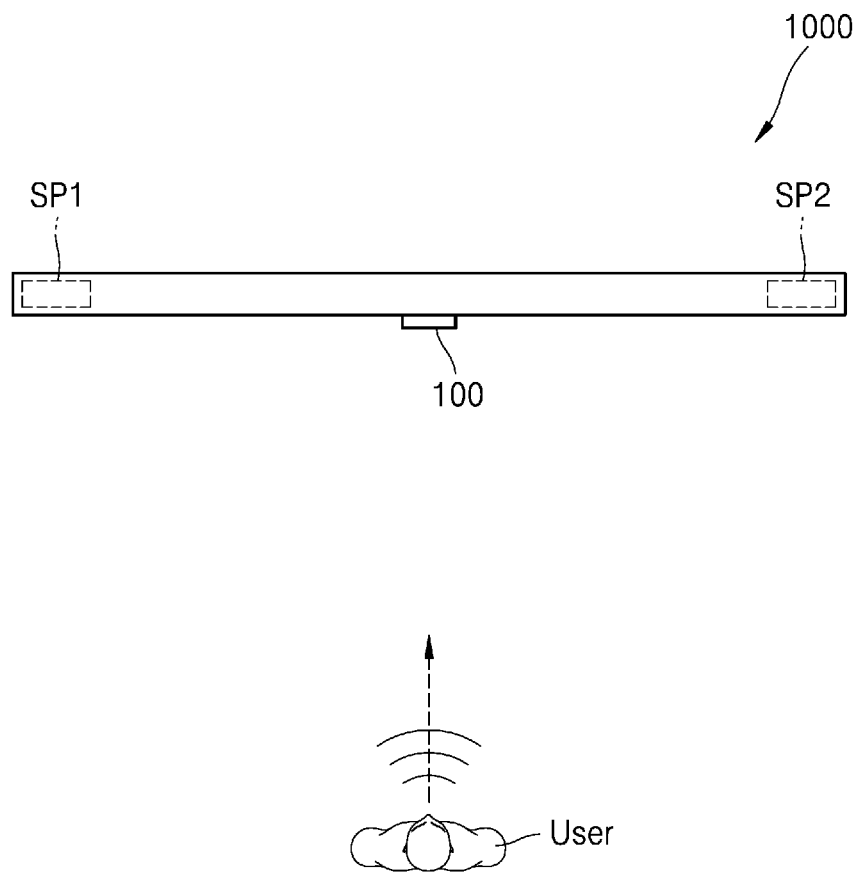
FIG. 20 illustrates an example of a TV employing a directional acoustic sensor according to an example embodiment.

FIG. 20 illustrates an example of a TV 1000 employing the directional acoustic sensor 100 according to an example embodiment.

Referring to FIG. 20, the directional acoustic sensor 100 according to an example embodiment may be provided, for example, at a lower portion of the front side of the TV 1000. TV speakers SP1 and SP2 may be located in the side direction of the directional acoustic sensor 100, and a user may be located in the front direction of the TV 1000.

As described above, as the signal processor 150 of the directional acoustic sensor 100 processes acoustic signals by using the front directional characteristics and the side directional characteristics, sound generated from the TV speakers SP1 and SP2 located in the side direction may be prevented from being input to the directional acoustic sensor 100, and accordingly, a voice command of a user located in the front direction of the TV 1000 may be effectively acquired.

In the above description, a case in which a plurality of directional characteristics obtained by the signal processor 150 include the front directional characteristics and the side directional characteristics is described. Besides, the signal processor 150 may obtain directional characteristics of various directions, and an acoustic signal in a specific direction may be attenuated much by processing the signals obtained by using the above obtained directional characteristics.

According to the directional acoustic sensor 100 according to an example embodiment, as the first and second resonance units 110 and 120 are arranged to have difference directionalities and the signal processor 150 calculates the sum of or the difference between the outputs of the first and second resonance units 110 and 120 at a certain ratio, the directional characteristics may be adjusted in various directions. Accordingly, beam steering characteristics may be implemented, and the user may separate and selectively acquire only a voice signal in a desired direction.

As the signal processor 150 processes signals obtained by using the directional characteristics in various directions, an acoustic signal in a specific direction may be prevented from being input to the directional acoustic sensor or attenuated much. When the directional acoustic sensor 100 is employed in electronic apparatuses, for example, TVs, smart speakers, or home appliance products, which perform voice commands of a user, the user voice command may be effectively acquired by selectively removing an acoustic signal generated in a specific direction among the acoustic signals input to the directional acoustic sensor 100.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A directional acoustic sensor comprising:
   a plurality of resonance units arranged to have different directionalities, the plurality of resonance units comprising a first resonance unit and a second resonance unit that are arranged to have an angle less than 180 degrees with respect to each other; and
   a signal processor configured to adjust directional characteristics of a first output signal and a second output signal that are received from the first resonance unit and the second resonance unit,
   wherein the signal processor attenuates an acoustic noise signal by calculating at least one of a sum of the first output signal and the second output signal and a difference between the first output signal and the second output signal at a predetermined ratio.

2. The directional acoustic sensor of claim 1, wherein each of the first resonance unit and the second resonance unit comprises:
   a substrate having an aperture; and
   at least one resonator provided on the substrate.

3. The directional acoustic sensor of claim 1, wherein the signal processor is further configured to acquire a first directional signal corresponding to a first direction by calculating the sum of the first output signal and the second output signal, and acquire a second directional signal corresponding to a second direction by calculating the difference between the first output signal and the second output signal.

4. The directional acoustic sensor of claim 1, wherein the signal processor is further configured to adjust at least one of output levels of the first output signal and the second output signal, and calculate the sum or the difference based on the adjusted at least one of the output levels.

5. The directional acoustic sensor of claim 1, wherein the signal processor is further configured to attenuate the acoustic noise signal generated in a second direction by processing a first signal that is obtained from the first resonance unit and the second resonance unit and is oriented in a first direction, and processing a second signal that is obtained from the first resonance unit and the second resonance unit and is oriented in the second direction perpendicular to the first direction.

6. The directional acoustic sensor of claim 5, wherein each of the first signal and the second signal is obtained by summing the first output signal and the second output signal generated in the first direction and the first output signal and the second output signal generated in the second direction at the predetermined ratio.

7. A method of adjusting directional characteristics of a directional acoustic sensor, the method comprising:
receiving a first output signal and a second output signal from a first resonance unit and a second resonance unit arranged to have different directionalities, and
attenuating an acoustic noise signal by adjusting directional characteristics of the first output signal and the second output signals,
wherein the acoustic noise signal is attenuated by calculating at least one of a sum of the first output signal and the second output signal and a difference between the first output signal and the second output signal at a predetermined ratio.

8. The method of claim 7, wherein the adjusting the directional characteristics of the first output signal and the second output signal comprises:
acquiring first directional characteristics of a first direction by calculating the sum of the first output signal and the second output signal; and
acquiring second directional characteristics of a second direction that is perpendicular to the first direction by calculating the difference between the first output signal and the second output signal.

9. The method of claim 7, wherein the adjusting the directional characteristics of the first output signal and the second output signal comprises:
adjusting at least one of output levels of the first output signal and the second output signal, and
calculating the sum or the difference based on the adjusted at least one of the output levels.

10. The method of claim 7, wherein
each of the first resonance unit and the second resonance unit comprise:
a substrate having an aperture; and
at least one resonator provided in the substrate,
wherein the first resonance unit and the second resonance unit are arranged to form an angle less than 180 degrees with each other.

11. The method of claim 7, wherein the attenuating the acoustic noise signal comprises:
attenuating the acoustic noise signal in a second direction by processing a first signal that is obtained from the first resonance unit and the second resonance unit oriented in a first direction, and processing a second signal that is obtained from the first resonance unit and the second resonance unit oriented in the second direction, the second direction being perpendicular to the first direction.

12. The method of claim 11, wherein the processing the first signal and the processing the second signal comprises:
summing the first and the second output signals generated in the first direction and the first and the second output signals generated in the second direction at the predetermined ratio.

* * * * *